(12) United States Patent
Lin et al.

(10) Patent No.: US 11,016,621 B1
(45) Date of Patent: May 25, 2021

(54) CAPACITIVE TOUCH SCREEN CAPABLE OF REDUCING SIDE LIGHT REFLECTION

(71) Applicant: Shantou Goworld Display Technology Co., Ltd., Guangdong (CN)

(72) Inventors: Min Lin, Guangdong (CN); Xichun Wu, Guangdong (CN); Yi Shen, Guangdong (CN); Yinghuang Sun, Guangdong (CN); Keng Lin, Guangdong (CN); Yuemin Lv, Guangdong (CN); Yuanming Chen, Guangdong (CN); Dezhi Lin, Guangdong (CN); Jiatong Gao, Guangdong (CN); Yongbin Huang, Guangdong (CN); Yan Wang, Guangdong (CN); Dingji Chen, Guangdong (CN)

( * ) Notice: Subject to any disclaimer, the term of this patent is extended or adjusted under 35 U.S.C. 154(b) by 0 days.

(21) Appl. No.: 16/643,589

(22) PCT Filed: May 23, 2018

(86) PCT No.: PCT/CN2018/087949
§ 371 (c)(1),
(2) Date: Mar. 2, 2020

(87) PCT Pub. No.: WO2019/052216
PCT Pub. Date: Mar. 21, 2019

(30) Foreign Application Priority Data

Aug. 18, 2017 (CN) .......................... 201721194375.1

(51) Int. Cl.
*G06F 3/044* (2006.01)
*G06F 3/041* (2006.01)

(52) U.S. Cl.
CPC .......... *G06F 3/0443* (2019.05); *G06F 3/0416* (2013.01); *G06F 3/0446* (2019.05); *G06F 2203/04111* (2013.01)

(58) Field of Classification Search
USPC ....................................................... 345/173
See application file for complete search history.

(56) References Cited

U.S. PATENT DOCUMENTS

2009/0242283 A1* 10/2009 Chiu ...................... G06F 3/0443
178/20.01
2011/0157086 A1* 6/2011 Ozeki ................... G06F 3/0446
345/174

(Continued)

*Primary Examiner* — Chineyere D Wills-Burns
(74) *Attorney, Agent, or Firm* — Prakash Nama; Global IP Services, PLLC

(57) ABSTRACT

A capacitive touch screen, having a first transparent substrate provided with a touch circuit layer. The touch circuit layer is provided with first and second electrodes and a jumper portion. The touch screen is further provided with an insulating layer. The insulating layer is continuously disposed in an entire transparent touch area of the touch screen, and is provided with through holes at the jumper portion to form a jumper connection of the second electrode. The touch screen further includes a shielding layer sandwiched between the first transparent substrate and the touch circuit layer, and contains multiple shielding blocks. The shielding blocks correspond to the through holes, and the contours of the shielding blocks are formed by expanding the contours of the through holes outwards. The capacitive touch screen can effectively reduce side light reflection on an edge slope of the insulating layer, thereby avoiding interference with display.

17 Claims, 8 Drawing Sheets

(56) References Cited

U.S. PATENT DOCUMENTS

| | | | |
|---|---|---|---|
| 2012/0169647 A1* | 7/2012 | Kuo | G06F 3/0446 345/174 |
| 2012/0200527 A1* | 8/2012 | Rumsby | G06F 3/0446 345/174 |
| 2012/0262385 A1* | 10/2012 | Kim | G06F 3/0446 345/173 |
| 2013/0038571 A1* | 2/2013 | Ho | G06F 3/0446 345/174 |
| 2014/0182888 A1* | 7/2014 | Chuang | G06F 3/0446 174/251 |
| 2015/0169105 A1* | 6/2015 | Tung | G06F 3/0446 345/174 |
| 2016/0034076 A1* | 2/2016 | Chien | G06F 3/0446 345/173 |
| 2016/0103529 A1* | 4/2016 | Kim | G06F 3/0446 216/13 |

* cited by examiner

CAPACITIVE TOUCH SCREEN CAPABLE OF REDUCING SIDE LIGHT REFLECTION

BACKGROUND OF THE INVENTION

The present invention relates to a kind of capacitive touch screen, and more specifically relates to a capacitive touch screen capable of reducing side light reflection.

A capacitive touch screen is generally provided with a transparent touch control zone, which can be arranged in front of a display screen to form a touch control display screen. As shown in FIGS. 1 and 2, the touch control function of the capacitive touch screen 100 is generally implemented by a touch control circuit layer 20 provided at an inner side of a transparent substrate 10. In a general prior art design, the touch control circuit layer 20 of the transparent touch control zone A comprises a plurality of first electrodes 21 and second electrodes 22. The first electrodes 21 and the second electrodes 22 mutually intersect to form a sensing array, and at each point of intersection, each first electrode 21 and each second electrode 22 are divided into a plurality of first electrode blocks 211 and a plurality of second electrode blocks 221 respectively; each point of intersection is provided with a jumper portion 23, and the jumper portion 23 generally comprises a first connection portion 231, a second connection portion 232, and an insulation pad 233. The first connection portion 231, the first electrode blocks 211 and the second electrode blocks 221 are patterned through a transparent conductive layer. The first connection portion 231 is connected to adjacent first electrode blocks 211 to form a corresponding first electrode 21 that is continuously conductive. The second connection portion 232 is patterned through another transparent conductive layer, and is connected to adjacent second electrode blocks 221 to form a corresponding second electrode 22 that is continuously conductive.

In each jumper portion 23, the insulating pad 233 is sandwiched between the first and second connection portions 231, 232, and a size of the insulating pad (generally 200 µm wide) has to be larger than an overlapping area of the first and second connection portions 231 and 232 to ensure insulation between the first and second connection portions 231 and 232, and in order to prevent the insulating pad 233 from affecting the transparency of the transparent touch control zone A, the insulating pad is generally made of transparent photosensitive resin; edges of the insulating pad 233 are sloped to allow better climbing of the first connection portion 231 or the second connection portion 232 over the edges of the insulating pad.

As shown in FIG. 2, surfaces of the insulating pad 233 generally reflect incident light. Therefore, when the capacitive touch screen is used under a strongly lighted environment, ambient light (a) coming from a sideward direction may be reflected by a sloped edge of the insulating pad 233 towards a front side as reflected light (a'). Due to a large incident angle (or reflection angle) in such light reflection, intensity of the reflection is also great, as anticipated by Fresnel formula. Therefore, when the screen is viewed under a strongly lighted environment, side light reflected at the sloped edge of the insulating pad may easily enter the eyes of the viewer and interferes with the viewing of the display screen.

BRIEF SUMMARY OF THE INVENTION

In view of the aforesaid disadvantages now present in the prior art, the present invention provides a capacitive touch screen capable of reducing side light reflection. The present invention can effectively reduce side light reflection of the touch screen, thereby reducing the interference with viewing the touch screen caused by the side light reflection. The present invention has the following technical solution:

A capacitive touch screen capable of reducing side light reflection, comprising at least one transparent touch control zone, which comprises a first transparent substrate and a touch control circuit layer provided at an inner side surface of the first transparent substrate; at least in the transparent touch control zone, the touch control circuit layer comprises a plurality of first electrodes and second electrodes; the first electrodes and the second electrodes mutually intersect to form a sensing array, and at each point of intersection, each first electrode and each second electrode are divided into a plurality of first electrode blocks and a plurality of second electrode blocks respectively;

a jumper portion is provided at each point of intersection; the jumper portion comprises a first connection portion, a second connection portion and an insulating layer; the first connection portion, the first electrode blocks and the second electrode blocks are formed by patterning a transparent first conductive layer; the first connection portion is connected to adjacent first electrode blocks to form a corresponding first electrode that is continuously conductive; the second connection portion is formed by patterning a second conductive layer, and is connected to adjacent second electrode blocks to form a corresponding second electrode that is continuously conductive; wherein, the insulating layer is a transparent insulating pad disposed continuously across the entire transparent touch control zone. The insulating layer is provided with through holes at each jumper portion, so that the second connection portion is electrically connected with the corresponding second electrode blocks via the through holes; and the capacitive touch screen also comprises a shielding layer; the shielding layer is sandwiched between the first transparent substrate and the touch control circuit layer; the shielding layer comprises a plurality of shielding blocks; the shielding blocks correspond to the through holes; an outer contour of each shielding block is equivalent to a widened outer contour of a corresponding through hole.

Specifically, the touch control circuit layer can be directly made at an inner side surface of the first transparent substrate, or can be made at an outer side surface of a second transparent substrate, whereas the first transparent substrate is then also attached to the outer side surface of the second transparent substrate, such that the touch control circuit layer is also disposed at the inner side surface of the first transparent substrate; the first transparent substrate and the second transparent substrate are made of transparent glass or plastic substrates, and each has a thickness of 0.2-6 mm; and the first transparent substrate or the second transparent substrate which the touch control circuit layer is directly made on is preferably a glass substrate that is more durable to high temperature so as to facilitate the processing of the touch control circuit layer. "Outer side surface" as described above refers to a surface of the first transparent substrate or the second transparent substrate nearer to a control means (e.g. a human finger) during use of the capacitive touch screen, while the "inner side surface" refers to another surface of the first transparent substrate or the second transparent substrate more distant from the control means.

The first conductive layer is a transparent conductive layer, more specifically, the first conductive layer is a transparent conductive oxide film made by indium tin oxide (ITO) or aluminum-doped zinc oxide (AZO) etc. The second conductive layer can be a transparent conductive layer or a non-transparent conductive layer, specifically, the second conductive layer can be a metal film or one more said transparent conductive oxide film; the metal film can be a metal film or an alloy film of a single layer or of multiple layers, preferably a three layer alloy film comprising "molybdenum niobium-aluminum neodymium-molybdenum niobium"; the first and second conductive layers are generally patterned through methods like photolithography to form the first electrodes, the second electrodes the first connection portion and the second connection portion; the touch control circuit layer also generally comprises peripheral conducting wires, connector ports and outer connector (e.g. FPC) disposed at the non-transparent touch control zone. The peripheral conducting wires and the connector ports can also be patterned on said transparent conductive film, metal film or another additionally provided conductive film layer.

The insulating layer can be a transparent photosensitive resin coating layer patterned by techniques like developing method (i.e. exposure using a graphic mask, and then performing the development). In general, the insulating layer may have a thickness within a range of 0.5-10 μm so as to ensure better patterning effect. The insulating layer is continuously disposed across the entire transparent touch control zone; in general, it can be considered that, within the transparent touch control zone, the insulating layer is a continuous and complete coating layer except in small areas opened with holes like the through holes. The through holes are holes formed on a coating surface of the insulation layer through patterning technique; each through hole is formed at an overlapping area of the second connection portion and a corresponding second electrode block, such that an electrical connection is formed between the corresponding second electrode block and the second connection portion; the through holes can be holes of different shapes such as circular holes or square holes; each through hole has a diameter or size preferably being 10-200 μm (specific value determined by an end width of the second connection portion, a thickness of the insulating layer, precision of the patterning technique and the conductivity requirement of the through hole); edges of each through hole are sloped, so as to facilitate better climbing of the second electrode blocks or the second connection portion over the edges.

The touch control circuit layer may have a "top jumper" structure having the second connection portion at a top side of the jumper portion, comprising the following manufacturing steps: 1) making the first conductive layer, and patterning the first conductive layer to form the first connection portion, the first electrode blocks and the second electrode blocks; 2) making the insulating layer, and patterning the insulating layer to form the through holes; and 3) making the second conductive layer, and patterning the second conductive layer to form the second connection portion. Alternatively, the touch control circuit layer may have a "bottom jumper" structure having the second connection portion at a bottom side of the jumper portion, comprising the following manufacturing steps: 1) making the second conductive layer, and patterning the second conductive layer to form the second connection portion; 2) making the insulating layer, and patterning the insulating layer to form the through holes; and 3) making the first conductive layer, and patterning the first conductive layer to form the first connection portion, the first electrode blocks and the second electrode blocks.

The shielding layer generally has a thickness of 0.5-10 μm. The shielding layer can be a dark material coating layer; specifically, the shielding layer is a coating layer containing dark substances such as dark dyes (e.g. blue, purple, black or mixed red-green-blue dyes), carbon particles and carbonized substances; preferably, the shielding layer is a dark photosensitive resin coating layer, that is, a coating layer photosensitive resin coating layer mixed with dark substances like dark dyes or carbon particles etc; also, the shielding layer can be patterned to form the shielding blocks by developing method; besides, the shielding layer can be formed by carbonizing thus darkening under high temperature of the transparent photosensitive resin coating layer patterned as the shielding blocks. Preferably, a proportion of the dark substances being used or determination of carbonizing conditions is such that the shielding layer has a visible light transmittance of 60% or below (i.e. 0-60%). The shielding blocks correspond to the through holes; an outer contour of each shielding block is equivalent to a widened outer contour of a corresponding through hole; the size being widened is generally determined based on graphic fitting precision between the shielding layer and the insulating layer; preferably, if the graphic fitting precision value between the shielding layer and the insulating layer is A, a ratio between the size B being widened for the outer contour of the shielding block with respect to the outer contour of the through hole and the value A (B/A) is 1-1.5; and this ratio can ensure the shielding effect of the shielding block, while preventing the problem of oversizing the shielding block that may affect the transparency of the transparent touch control zone; or preferably, based on the current technical level of making a capacitive touch screen, the size being widened for the outer contour of the shielding block with respect to the outer contour of the through hole is 3-30 μm; preferably, both the shielding block and the corresponding through hole have a circular outer contour; in general, the shielding block and the corresponding through hole are designed to have a circular shape because this shape has a higher patterning precision, therefore the size of the shielding block can be reduced as much as possible to reduce the influence of the shielding block to the transparency of the transparent touch control zone.

When the touch control circuit layer is directly made at an inner side surface of the first transparent substrate, the shielding blocks can be made at the inner side surface of the first transparent substrate prior to the touch control circuit layer, so that the shielding blocks are provided at a bottom side surface of the touch control circuit layer; when the touch control circuit layer is made at an outer side surface of the second transparent substrate, and then the first transparent substrate is also attached to the outer side of the second transparent substrate, the shielding blocks can be made on the top side surface of the touch control circuit layer after making the touch control screen circuit layer on the second transparent substrate, so that the shielding blocks are disposed at a top side surface of the touch control circuit layer besides, the touch control circuit layer and the shielding blocks can also be made on the outer side surface of the second transparent substrate and the inner side surface of the first transparent substrate respectively.

Preferably, the second conductive layer is also a transparent conductive layer, so that the second connection portion is also transparent. Also, in at least some of the jumper portions, the through holes in each of these jumper portions are two through holes provided at two ends of the second connection portion respectively, and the shielding blocks provided are two isolated blocks corresponding to the two through holes. According to these configurations, the surface areas covered by the shielding blocks are minimized such that their influence to the transparency of the transparent touch control zone can also be minimized.

Preferably, the second conductive layer is a metal layer, such that the second connection portion is a metal connecting wire; in at least some of the jumper portions, the through holes in each of these jumper portions are two through holes provided at two ends of the second connection portion respectively, and the shielding blocks provided are two blocks corresponding to the two through holes, and a shielding strip being part of the shielding layer is provided between and connecting the two shielding blocks; the shielding strip is used for shielding the second connection portion. According to these configurations, the metal layer being the second conductive layer can also be formed with low resistance peripheral conducting wires of the touch control circuit layer thereon, thereby saving additional procedures to make the conducting wires. Although the second connection portion is a non-transparent metal connecting wire, the second connection portion and the shielding strip can be made to have narrow widths because the resistivity of the metal layer is very low. Therefore, the influence to the transparency of the transparent touch control zone is not great. Typically, the shielding blocks and the shielding strip generally form a dumbbell shape wider at two ends and narrower in the middle.

Preferably, the shielding layer also comprises a peripheral shielding frame; the peripheral shielding frame serves to conceal the peripheral conducting wires of the touch control circuit layer. The shielding layer can be formed at the same time when making the shielding blocks, thereby not adding any additional steps to the manufacturing process of the capacitive touch screen. Also, the capacitive touch screen may appear more aesthetically pleasing.

Compared with the prior art, the capacitive touch screen provided by the present invention has the following advantages:

The insulating layer of the touch control circuit layer is a transparent insulating layer continuously spanning across the entire transparent touch control zone, except for the through holes provided at each jumper portion to achieve jumper connection between the second connection portion and the corresponding second electrode blocks; and the through holes are concealed by the shielding blocks. Therefore, when the capacitive touch screen is used under a strongly lighted environment, sideward incident light projecting to sloped edges of the through hole may be reduced or prevented, thereby effectively reducing side light reflection and thus its interference with viewing the touch screen display. Further, the jumper portion of the present invention uses through holes to achieve jumper connection, compared with the use of insulating pad as in the prior art, the through holes are generally required to be provided only in the overlapping area of the second connection portion and the corresponding second electrode blocks, therefore they are minimized in size, and hence the shielding blocks for concealing the corresponding through holes can also be made in a minimized size to avoid influence to the transparency of the transparent touch control zone.

The technical solution of the present invention will be described in detail below with reference to the drawings and the embodiments.

FIG. is a schematic illustration of a capacitive touch screen according to embodiment 1 of the present invention (inner side of the touch screen facing upwardly).

Figure 4:
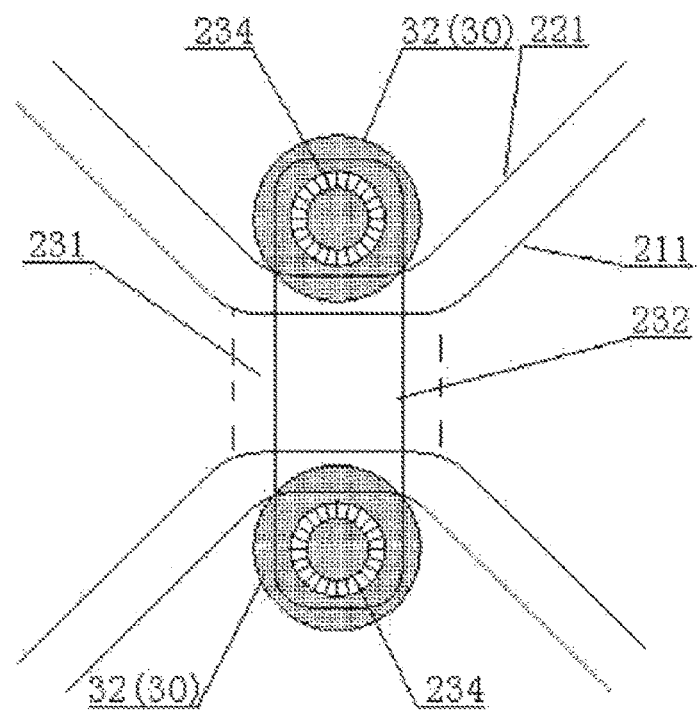

FIG. 4 is a top plan view of a jumper portion of the capacitive touch screen according to embodiment 1 of the present invention.

Figure 5:
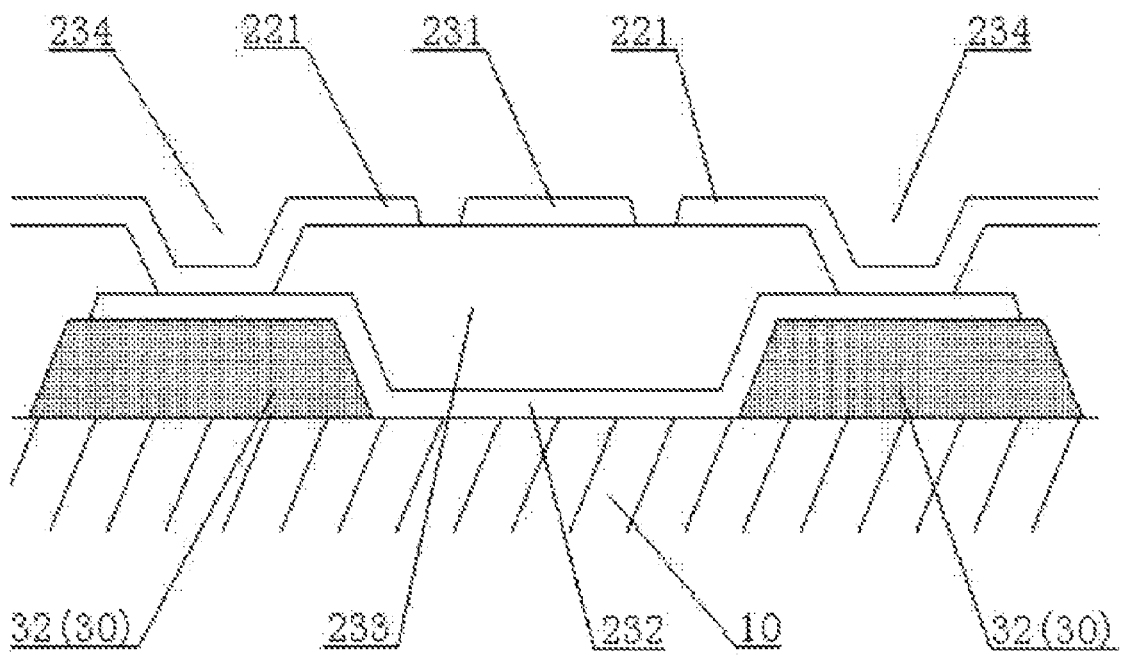

FIG. 5 is a sectional view of the jumper portion of the capacitive touch screen according to embodiment 1 of the present invention.

Figure 6:
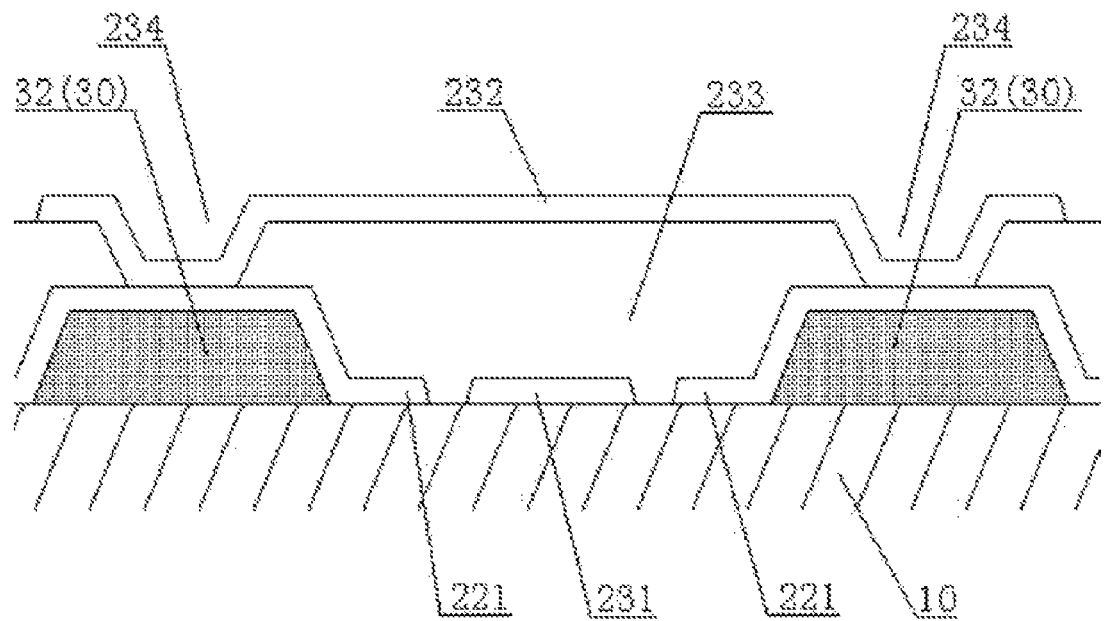

FIG. 6 is a sectional view of a jumper portion of another capacitive touch screen according to embodiment 1 of the present invention.

Figure 7:
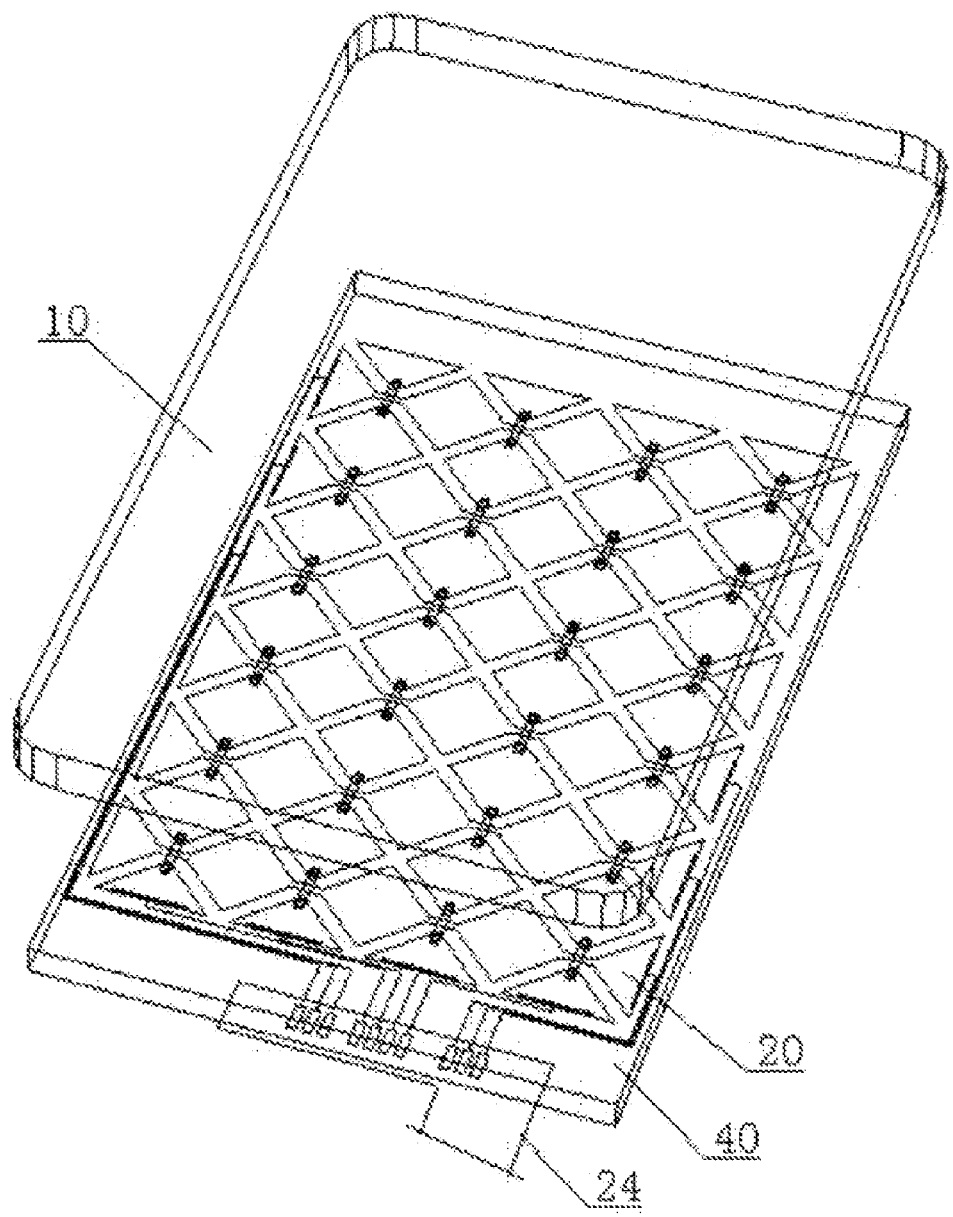
Figure 8:
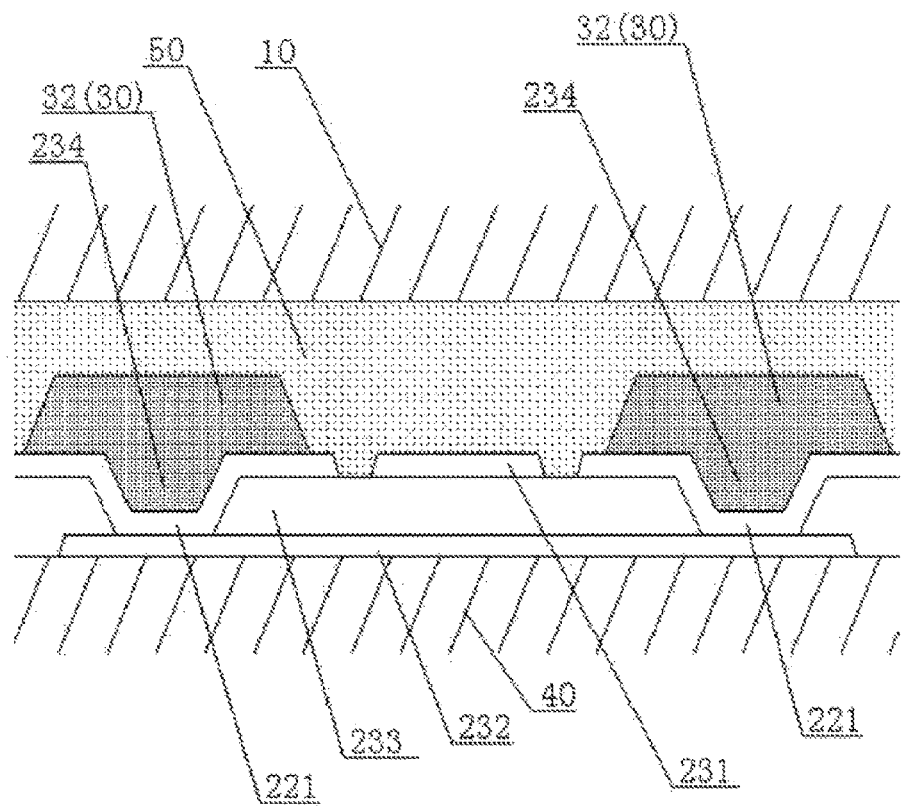

FIG. 7 shows the layering of a capacitive touch screen according to embodiment 2 of the present invention (outer side of the touch screen facing upwardly), FIG. 8 is a sectional view of a jumper portion of the capacitive touch screen according to embodiment 2 of the present invention.

Figure 9:
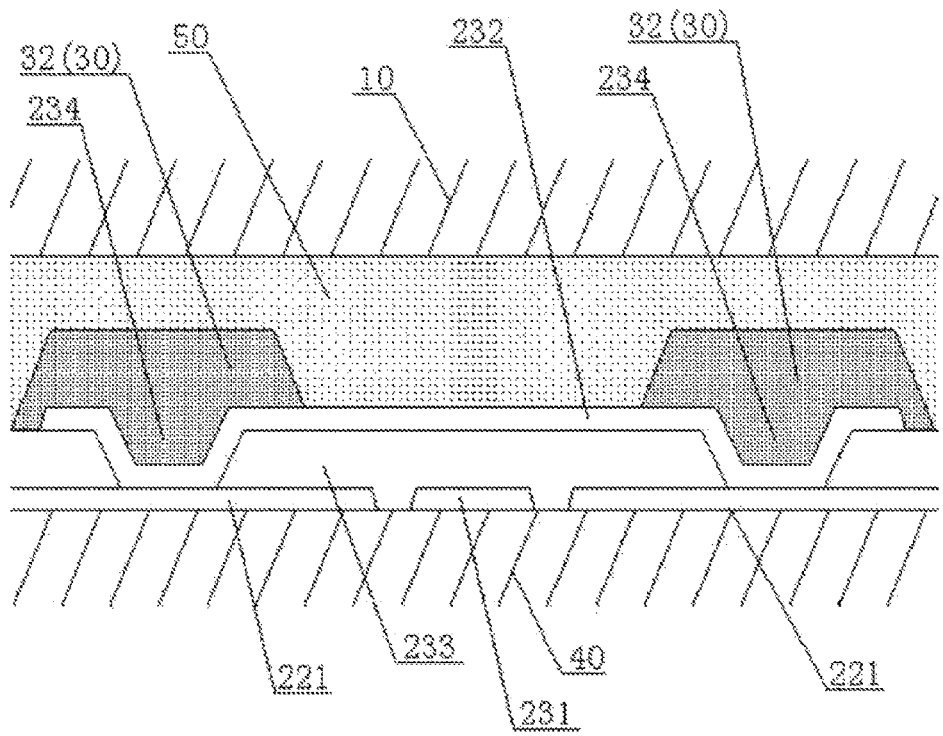

FIG. 9 is a sectional view of a jumper portion of another capacitive touch screen according to embodiment 2 of the present invention.

Figure 10:
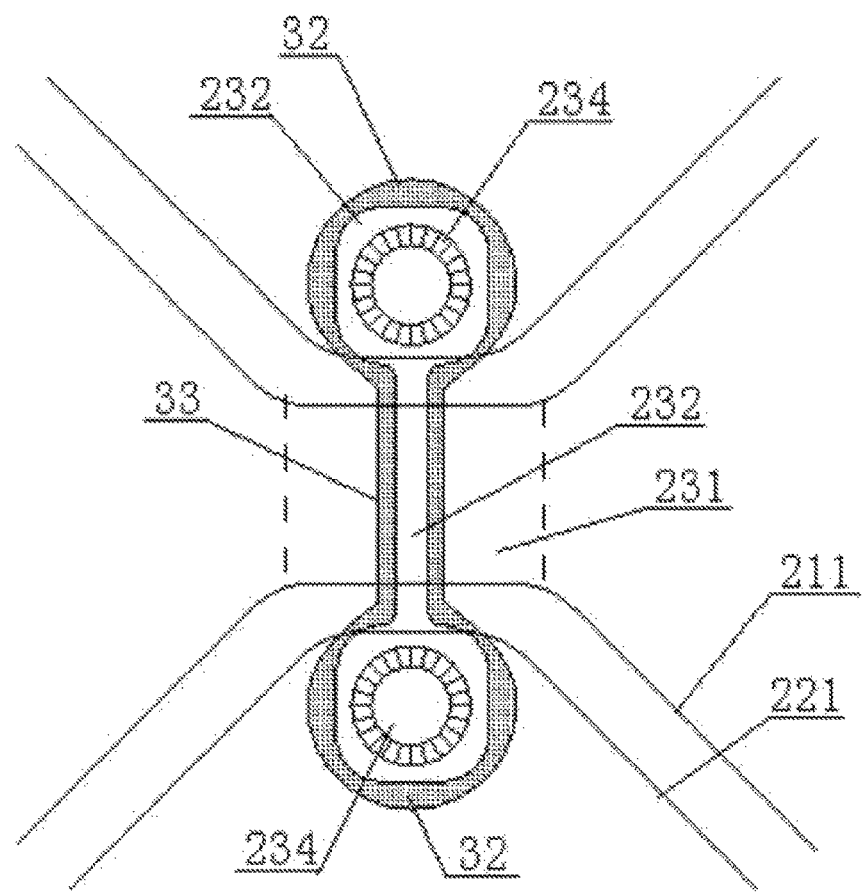
Figure 11:
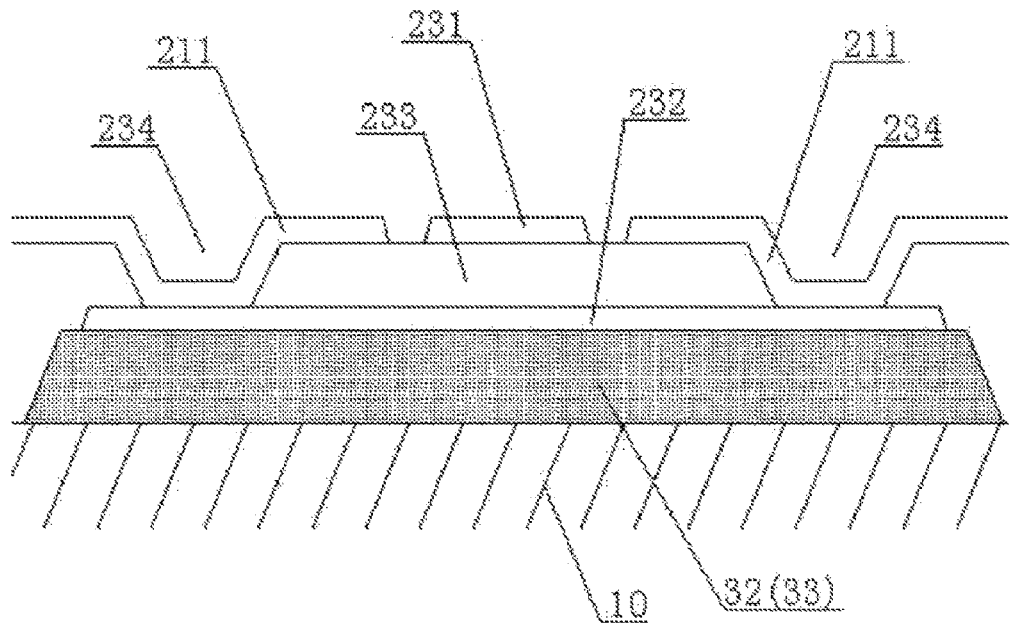
Figure 12:
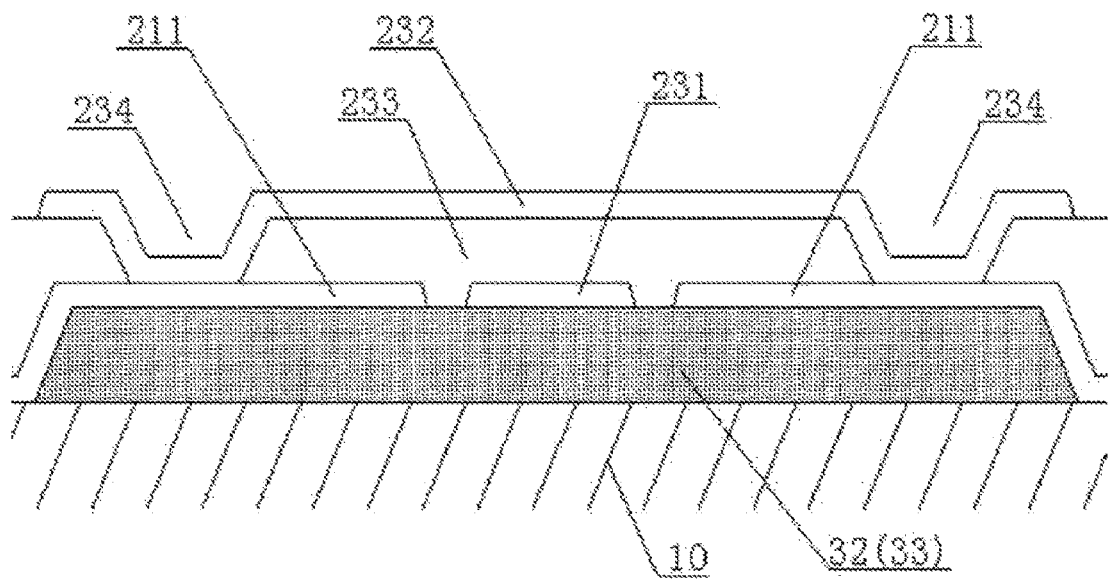
Figure 13:
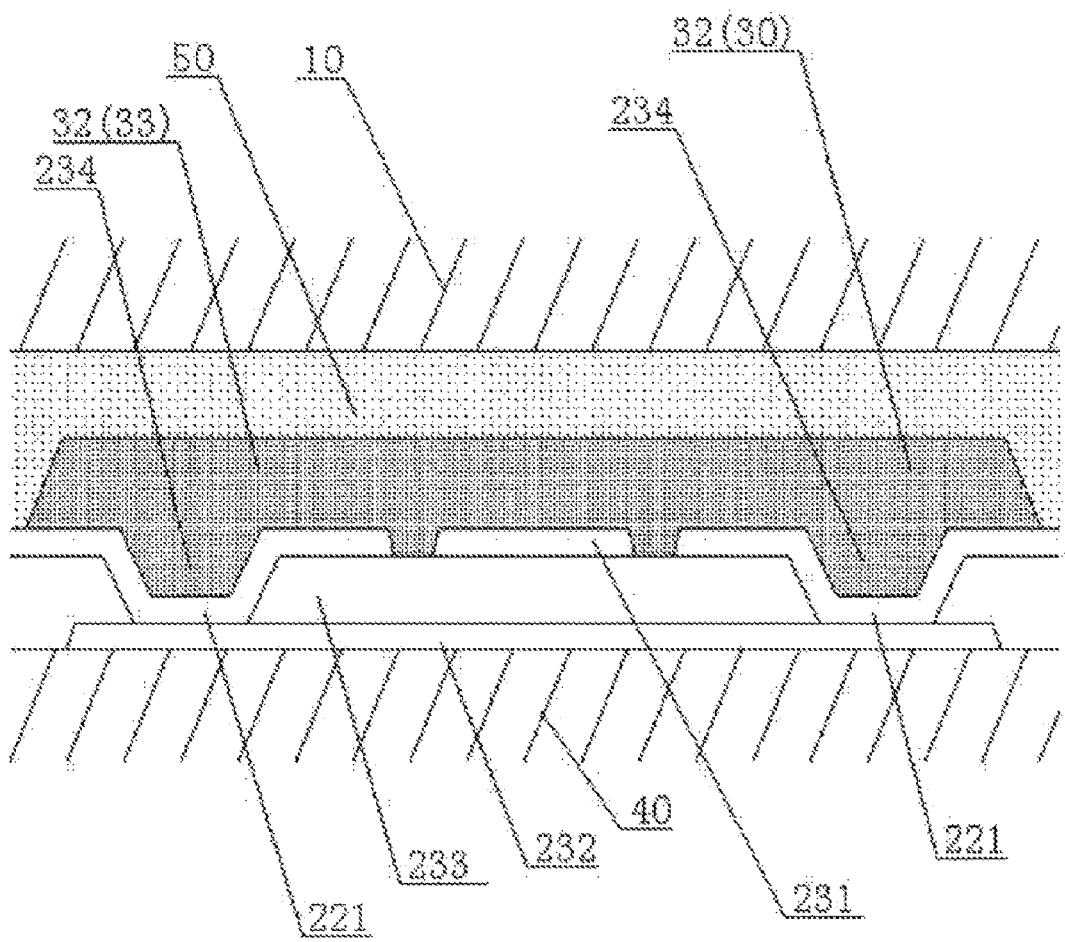
Figure 14:
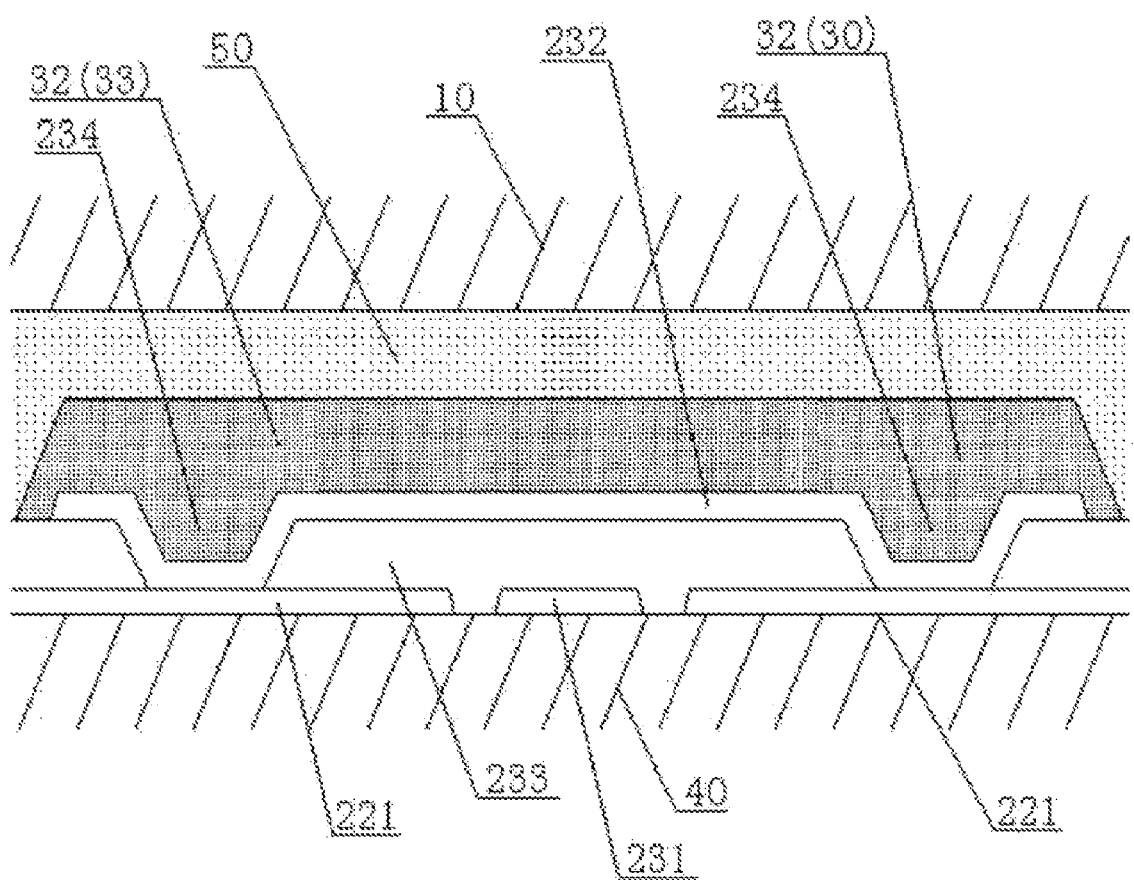

FIG. 10 is a top plan view of a jumper portion of a capacitive touch screen according to embodiment 3 of the present invention.

FIGS. 11-14 are sectional views of the jumper portion of the capacitive touch screen according to embodiment 3 of the present invention along an extending direction of a shielding strip.

DETAILED DESCRIPTION OF THE INVENTION

Embodiment 1

Figure 1:
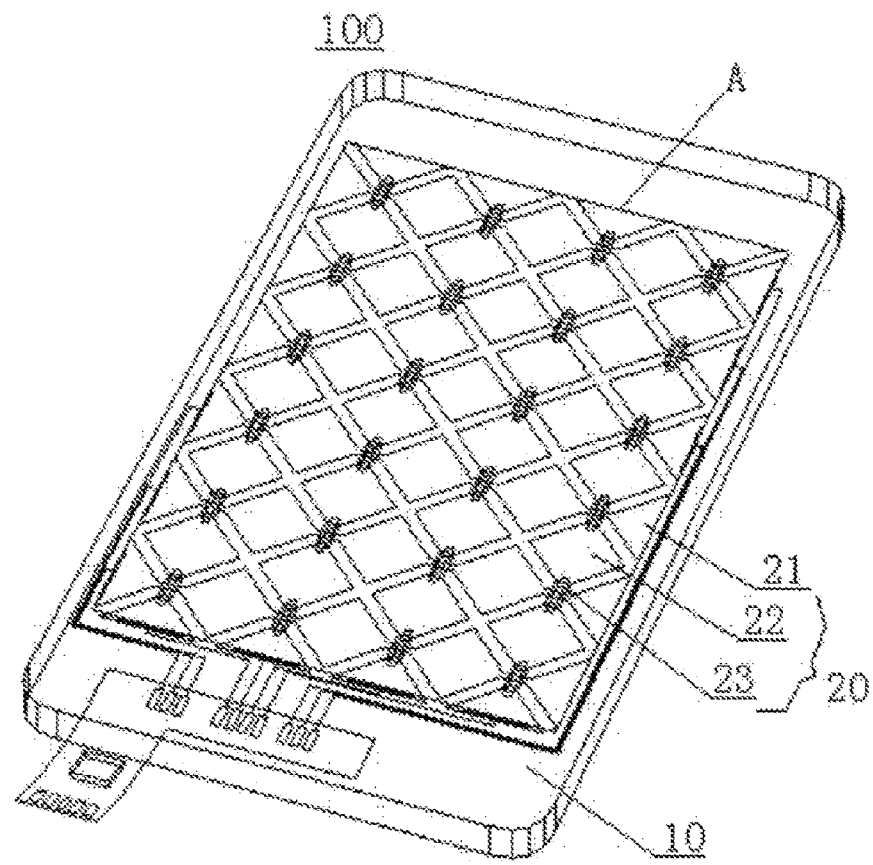
FIG. 1 is a schematic illustration of a jumper design of a capacitive touch screen according to prior art (inner side of the touch screen facing upwardly)
Figure 2:
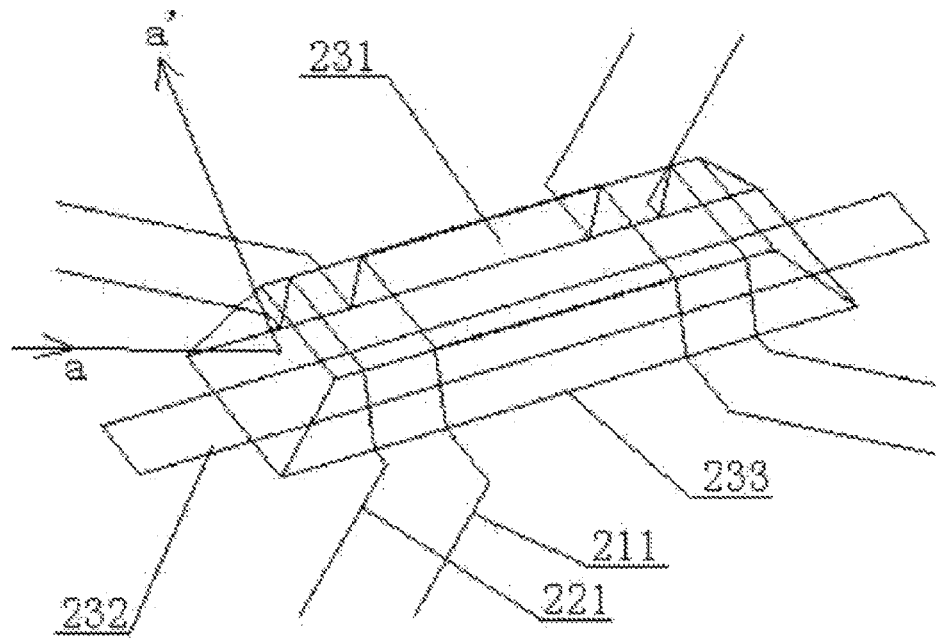
FIG. 2 is a schematic illustration of a jumper portion of the touch screen illustrated in FIG. 1, and side light reflection occurred thereon.
Figure 3:
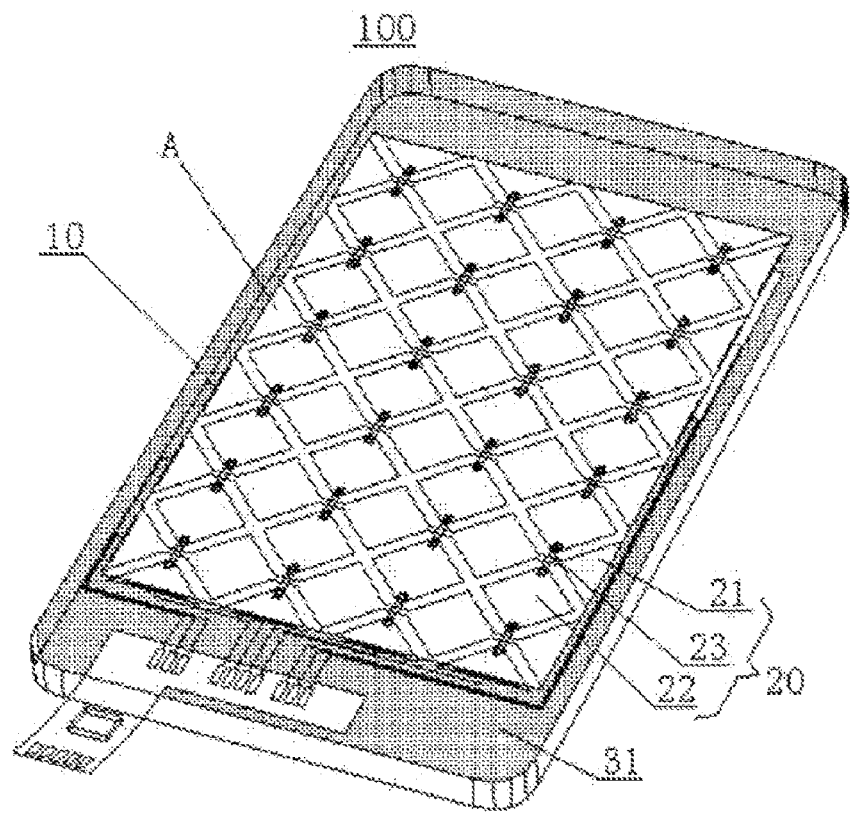

As shown in FIG. 3, FIG. 4, and FIG. 5, a capacitive touch screen 100 comprises a glass substrate 10 being a first transparent substrate; the glass substrate has a thickness of 0.6 mm (should be within a range of 0.2-6 mm thick); a touch control circuit layer 20 is directly made on an inner side surface of the glass substrate 10. In a transparent touch control zone A of the capacitive touch screen, the touch control circuit layer 20 comprises a plurality of first electrodes 21 and second electrodes 22; the first electrodes 21 and the second electrodes 22 mutually intersect to form a sensing array, and at each point of intersection, each first electrode 21 and each second electrode 22 are divided into a plurality of first electrode blocks 211 and a plurality of second electrode blocks 221 respectively; each point of intersection is provided with a jumper portion 23, and the jumper portion 23 comprises a first connection portion 231, a second connection portion 232, and a corresponding partial insulating pad 233; the first connection portion 231, the first electrode blocks 211 and the second electrode blocks 221 are formed by photolithography of a first indium tin oxide film being a first conductive layer; the first connection portion 231 is connected to adjacent first electrode blocks 211 to form a corresponding first electrode 21 that is continuously conductive; the second connection portion 232 is formed by photolithography of a second indium tin oxide film being a second conductive layer, and is connected to adjacent second electrode blocks 221 to form a corresponding second electrode 22 that is continuously conductive.

The insulating layer 233 is a transparent photosensitive resin coating layer disposed across the entire transparent touch control zone A; the insulating layer has a thickness of 0.5 µm (possibly between 0.5-10 µm); the insulating layer 233 is formed with a plurality of circular through holes 234 each having a diameter of 40 µm through a developing method; each through hole is formed at an overlapping area of the second connection portion 232 and a corresponding second electrode block 221, such that a jumper connection is formed between the corresponding second electrode block 221 and the second connection portion 232 by the through hole 234, therefore, each jumper portion 23 has two through holes.

A shielding layer 30 is disposed at a bottom surface of the touch control circuit layer 20, the shielding layer is a dark photosensitive resin coating (a coating that is mixed with carbon nanoparticles or a dark dye to maintain a dark color) having a thickness of 1 µm (should be within a range of 0.5-10 µm); a visible light transmittance is between 2%-20% (should be less than 60%). The shielding layer 30 is graphically developed through a developing method into a peripheral shielding frame 31 and shielding blocks 32 corresponding to the through holes 234. An outer contour of each shielding block 32 is equivalent to an outer contour of a corresponding through hole 234 widened by 15 µm (the size being widened can also be determined according to different graphic fitting precision values of different manufacturers, for example, it can be around 1.2 times of the graphic fitting precision value; based on different technical conditions provided by different manufacturers, the size being widened is generally 3-30 µm). In each jumper portion, there are two mutually isolated shielding blocks 32 each being a circular block having a diameter of only 70 µm. Due to the shielding effect of the shielding blocks 32, when the touch screen 100 is used in a strongly lighted environment, ambient light will not be projected on the sloped edges of the through hole 234, therefore side light reflection which affects display will not occur.

To manufacture the capacitive touch screen 100, making the shielding layer 30 on the glass substrate 10 first, and then making the touch control circuit layer 20; the touch control circuit layer 20 is made according to the following steps:

(1) depositing a second indium tin oxide film, and patterning the second indium tin oxide film to form a second connection portion 232;

(2) disposing an insulating layer 233 by coating, and patterning the insulating layer to form through holes 234;

(3) depositing a first indium tin oxide film, and patterning the first indium tin oxide film to form a first connection portion 231, first electrode blocks 211 and second electrode blocks 221.

According to other detailed implementation of the present embodiment, the touch control circuit layer 20 is made according to following steps:

(1) depositing a first indium tin oxide film, and patterning the first indium tin oxide film to form a first connection portion 231, first electrode blocks 211 and second electrode blocks 221;

(2) disposing an insulating layer 233 by coating, and patterning the insulating layer to form through holes 234;

(3) depositing a second indium tin oxide film, and patterning the second indium tin oxide film to form a second connection portion 232.

Accordingly, the touch screen can have the jumper portion with a structure shown by the sectional view of FIG. 6.

In other detailed implementation of the present embodiment, the shielding layer 30 can be formed by carbonizing thus darkening under high temperature of a transparent photosensitive resin layer patterned as shielding blocks 32; other transparent substrates may be attached to outer side surfaces of the glass substrate 10 in order to protect the glass substrate 10.

Embodiment 2

As shown in FIG. 7, FIG. 8 and FIG. 9, embodiment 2 is achieved on the basis of embodiment 1, however the touch control circuit layer 20 is instead disposed at an outer side surface of another glass substrate 40 being a second transparent substrate; the shielding layer 30 is provided on a top surface of the touch control circuit layer 20; and the first transparent substrate 10 is then adhered to an outer side of the second transparent substrate 40 through a transparent adhesive layer 50. In this embodiment 2, the touch control circuit layer 20 is sandwiched between the first transparent substrate 10 and the second transparent substrate 40, thereby being more durable.

To manufacture the capacitive touch screen of embodiment 2, making the touch control circuit layer 20 at an outer side surface of the second transparent substrate 40, then making a patterned shielding layer 30 on the touch control circuit layer 20, and then installing an FPC 24, and finally adhering the first transparent substrate 10 to the outer side of the second transparent substrate 40. Accordingly, the jumper portion of the capacitive touch screen 100 will generally has a structure shown by the sectional view of FIG. 8 or FIG. 9. The first transparent substrate 40 can be glass substrate or plastic substrate.

Embodiment 3

As shown in FIG. 10, embodiment 3 is achieved based on embodiment 1 or 2, however the second conductive layer is configured as a metal layer, so that the second connection portion 232 is configured as a metal connecting wire. The two shielding blocks 32 of each jumper portion 23 are connected by a shielding strip 33 of a common shielding layer 30. As such, a combined shielding block having a shape resembling a dumbbell which is wider at two ends and narrower in the middle part can be obtained. The metal connecting wire has a width of 15 µm, and the shielding strip 33 has a width of 45 µm. According to embodiment 3, the jumper portion 23 of the capacitive touch screen will have a structure shown by the sectional view of FIG. 11, FIG. 12, FIG. 13 or FIG. 14.

Also, it should be noted that, the designations etc. of various components may be different in the different embodiments described. All simple changes or changes achieving equivalent technical effect based on the structures, characteristics and principles of the present invention should fall within the scope of protection of the present invention. A person skilled in this field of art may make changes or additions or employ similar alternatives to the above described embodiments, and all of these should fall within the scope of protection of the present invention, provided that they are not deviated from the structure disclosed by the present invention or exceed the scope defined by the present invention.

What is claimed is:

1. A capacitive touch screen capable of reducing side light reflection, comprising at least one transparent touch control zone, which comprises a first transparent substrate and a touch control circuit layer provided at an inner side surface of the first transparent substrate; at least in the transparent touch control zone, the touch control circuit layer comprises a plurality of first electrodes and second electrodes; the first electrodes and the second electrodes mutually intersect to form a sensing array, and at each point of intersection, each first electrode and each second electrode are divided into a plurality of first electrode blocks and a plurality of second electrode blocks respectively;

a jumper portion is provided at each point of intersection; the jumper portion comprises a first connection portion, a second connection portion and an insulating layer; the first connection portion, the first electrode blocks corresponding to the jumper portion and the second electrode blocks corresponding to the jumper portion are formed by patterning a transparent first conductive layer; the first connection portion is connected to adjacent first electrode blocks to form a corresponding first electrode that is continuously conductive; the second connection portion is formed by patterning a second conductive layer, and is connected to adjacent second electrode blocks to form a corresponding second electrode that is continuously conductive;

wherein, the insulating layer is a transparent insulating pad disposed continuously across the entire transparent touch control zone; the insulating layer is provided with through holes at each jumper portion, so that the second connection portion is electrically connected with the corresponding second electrode blocks via the through holes; and the capacitive touch screen also comprises a shielding layer; the shielding layer is sandwiched between the first transparent substrate and the touch control circuit layer; the shielding layer comprises a plurality of shielding blocks; the shielding blocks correspond to the through holes; an outer contour of each shielding block is equivalent to a widened outer contour of a corresponding through hole.

2. The capacitive touch screen of claim 1, wherein the touch control circuit layer is directly made at an inner side surface of the first transparent substrate; the shielding blocks are provided at a bottom side surface of the touch control circuit layer.

3. The capacitive touch screen of claim 1, wherein the touch control circuit layer is made at an outer side surface of a second transparent substrate, whereas the first transparent substrate is then also attached to the outer side surface of the second transparent substrate; the shielding blocks are disposed at a top side surface of the touch control circuit layer.

4. The capacitive touch screen of claim 1, wherein each through hole is formed at an overlapping area of the second connection portion and a corresponding second electrode block.

5. The capacitive touch screen of claim 1, wherein each through hole has a diameter or size of 10-200 μm.

6. The capacitive touch screen of claim 1, wherein the shielding layer has a thickness of 0.5-10 μm.

7. The capacitive touch screen of claim 1, wherein the shielding layer is a dark material coating layer.

8. The capacitive touch screen of claim 1, wherein the shielding layer is a dark photosensitive resin coating layer.

9. The capacitive touch screen of claim 1, wherein the shielding layer is formed by carbonizing thus darkening under high temperature of a transparent photosensitive resin coating layer patterned as the shielding blocks.

10. The capacitive touch screen of claim 1, wherein the shielding layer has a visible light transmittance of 60% or below.

11. The capacitive touch screen of claim 1, wherein a graphic fitting precision value between the shielding layer and the insulating layer is A, and a size being widened for the outer contour of the shielding block with respect to the outer contour of the through hole is B; a ratio of B to A is 1-1.5.

12. The capacitive touch screen of claim 1, wherein a size being widened for the outer contour of the shielding block with respect to the outer contour of the through hole is 3-30 μm.

13. The capacitive touch screen of claim 1, wherein both the shielding block and the corresponding through hole have a circular outer contour.

14. The capacitive touch screen of claim 1, wherein the second conductive layer is a transparent conductive layer, so that the second connection portion is transparent; also, in at least some of the jumper portions, the through holes in each of the jumper portions are two through holes provided at two ends of the second connection portion respectively, and the shielding blocks provided are two isolated blocks corresponding to two said through holes respectively.

15. The capacitive touch screen of claim 1, wherein the second conductive layer is a metal layer, such that the second connection portion is a metal connecting wire; in at least some of the jumper portions, the through holes in each of the jumper portions are two through holes provided at two ends of the second connection portion respectively, and the shielding blocks provided are two blocks corresponding to two said through holes, and a shielding strip being part of the shielding layer is provided between and connecting the two shielding blocks; the shielding strip shields the second connection portion.

16. The capacitive touch screen of claim 15, wherein the shielding blocks and the shielding strip form a dumbbell shape wider at two ends and narrower in the middle.

17. The capacitive touch screen of claim 1, wherein the shielding layer also comprises a peripheral shielding frame; the peripheral shielding frame conceals the peripheral conducting wires of the touch control circuit layer.

\* \* \* \* \*